United States Patent
Loge et al.

(10) Patent No.: US 7,522,611 B2
(45) Date of Patent: Apr. 21, 2009

(54) VARIABLE SIZED INFORMATION FRAME SWITCH FOR ON-BOARD SECURITY NETWORKS

(75) Inventors: Alain Loge, Boulogne (FR); Christian Pitot, Boulogne (FR)

(73) Assignee: Thales (FR)

( * ) Notice: Subject to any disclaimer, the term of this patent is extended or adjusted under 35 U.S.C. 154(b) by 859 days.

(21) Appl. No.: 10/250,479

(22) PCT Filed: Mar. 8, 2002

(86) PCT No.: PCT/FR02/00843

§ 371 (c)(1),
(2), (4) Date: Jul. 2, 2003

(87) PCT Pub. No.: WO02/076002

PCT Pub. Date: Sep. 26, 2002

(65) Prior Publication Data

US 2004/0076147 A1   Apr. 22, 2004

(30) Foreign Application Priority Data

Mar. 16, 2001  (FR) ................................. 01 03625

(51) Int. Cl.
   *H04L 12/54* (2006.01)
   *H04L 12/56* (2006.01)
(52) U.S. Cl. .................. 370/395.72; 370/428
(58) Field of Classification Search ............. 370/395.72
   See application file for complete search history.

(56) References Cited

U.S. PATENT DOCUMENTS

| | | | |
|---|---|---|---|
| 5,233,603 A | 8/1993 | Takeuchi et al. | |
| 5,375,208 A | 12/1994 | Pitot | |
| 5,701,315 A | 12/1997 | Pitot et al. | |
| 5,719,577 A | 2/1998 | Pitot et al. | |
| 5,859,849 A * | 1/1999 | Parks | 370/395.72 |
| 5,905,725 A * | 5/1999 | Sindhu et al. | 370/389 |
| 6,021,129 A * | 2/2000 | Martin et al. | 370/395.72 |
| 6,046,644 A | 4/2000 | Pitot et al. | |
| 6,195,361 B1 * | 2/2001 | Kondoh et al. | 370/412 |
| 6,204,786 B1 | 3/2001 | Bieth et al. | |
| 6,510,161 B2 * | 1/2003 | Trevitt et al. | 370/412 |
| 6,519,655 B1 | 2/2003 | Pitot et al. | |
| 6,571,300 B2 | 5/2003 | Pitot et al. | |

(Continued)

FOREIGN PATENT DOCUMENTS

EP   0299473   1/1989

(Continued)

*Primary Examiner*—Gregory B Sefcheck
(74) *Attorney, Agent, or Firm*—Lowe Hauptman Ham & Berner, LLP

(57) ABSTRACT

This switch comprises a central buffer memory (30) for temporarily storing the data traffic which it receives, the time for performing the routings and for carrying out the resendings of the messages that it receives. It is noteworthy in that its central buffer memory (30) and the accesses to this buffer memory (30) by its various input/output ports are managed by a sequencer (40) in such a way as to have an implicit measure of the timescale for storing the messages in the central buffer memory (30) and to minimize the number of switchings which generate consumption and electromagnetic disturbances. Advantageously, the buffer memory is embodied with the aid of several modules (A, B, C, D) operating in parallel.

15 Claims, 9 Drawing Sheets

U.S. PATENT DOCUMENTS

Figure 1:
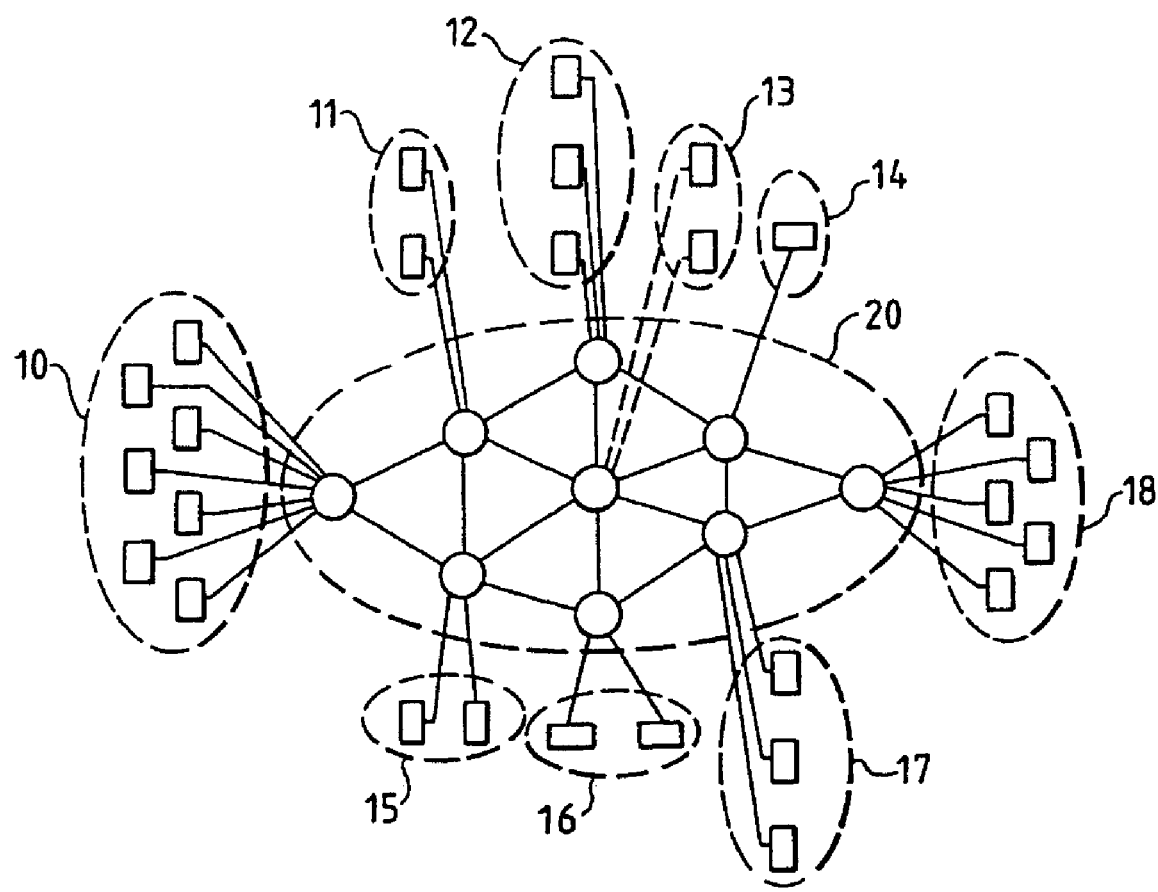

| | | | |
|---|---|---|---|
| 6,625,157 B2 * | 9/2003 | Niu et al. | 370/395.71 |
| 6,700,894 B1 * | 3/2004 | Shung | 370/412 |
| 6,977,941 B2 * | 12/2005 | Takahashi et al. | 370/412 |
| 7,035,267 B1 * | 4/2006 | Zhou et al. | 370/395.72 |
| 2002/0131421 A1 * | 9/2002 | Reshef et al. | 370/395.72 |
| 2005/0207423 A1 * | 9/2005 | Herbst | 370/395.7 |
| 2007/0104187 A1 * | 5/2007 | Tatapudi et al. | 370/368 |

FOREIGN PATENT DOCUMENTS

| | | |
|---|---|---|
| EP | 0715436 | 6/1996 |

* cited by examiner

FIG.8

| TIME SLOTS | MODULE A ACCESSES | MODULE B ACCESSES | MODULE C ACCESSES |
|---|---|---|---|
| -1 | | | |
| 0 | W0 | R16 | R0 |
| 1 | W1 | R17 | R1 |
| 2 | W2 | R18 | R2 |
| 3 | W3 | R29 | R3 |
| 4 | W4 | R20 | R4 |
| 5 | W5 | R21 | R5 |
| 6 | W6 | R22 | R6 |
| 7 | W7 | R23 | R7 |
| 8 | W8 | R24 | R8 |
| 9 | W9 | R25 | R9 |
| 10 | W10 | R26 | R10 |
| 11 | W11 | R27 | R11 |
| 12 | W12 | R28 | R12 |
| 13 | W13 | R29 | R13 |
| 14 | W14 | R30 | R14 |
| 15 | W15 | | R15 |
| 16 | W16 | W0 | R16 |
| 17 | W17 | W1 | R17 |
| 18 | W18 | W2 | R18 |
| 19 | W19 | W3 | R19 |
| 20 | W20 | W4 | R20 |
| 21 | W21 | W5 | R21 |
| 22 | W22 | W6 | R22 |
| 23 | W23 | W7 | R23 |
| 24 | W24 | W8 | R24 |
| 25 | W25 | W9 | R25 |
| 26 | W26 | W10 | R26 |
| 27 | W27 | W11 | R27 |
| 28 | W28 | W12 | R28 |
| 29 | W29 | W13 | R29 |
| 30 | W30 | W14 | R30 |
| 31 | | W15 | |
| 32 | R0 | W16 | W0 |
| 33 | R1 | W17 | W1 |
| 34 | R2 | W18 | W2 |
| 35 | R3 | W19 | W3 |
| 36 | R4 | W20 | W4 |
| 37 | R5 | W21 | W5 |
| 38 | R6 | W22 | W6 |
| 39 | R7 | W23 | W7 |
| 40 | R8 | W24 | W8 |
| 41 | R9 | W25 | W9 |
| 42 | R10 | W26 | W10 |
| 43 | R11 | W27 | W11 |
| 44 | R12 | W28 | W12 |
| 45 | R13 | W29 | W13 |
| 46 | R14 | W30 | W14 |
| 47 | R15 | | W15 |
| 48 | R16 | R0 | W16 |
| 49 | R17 | R1 | W17 |
| 50 | R18 | R2 | W18 |
| 51 | R19 | R3 | W19 |
| 52 | R20 | R4 | W20 |
| 53 | R21 | R5 | W21 |
| 54 | R22 | R6 | W22 |
| 55 | R23 | R7 | W23 |
| 56 | R24 | R8 | W24 |
| 57 | R25 | R9 | W25 |
| 58 | R26 | R10 | W26 |
| 59 | R27 | R11 | W27 |
| 60 | R28 | R12 | W28 |
| 61 | R29 | R13 | W29 |
| 62 | R30 | R14 | W30 |
| 63 | | R15 | |
| 64 | W0 | R16 | R0 |
| 65 | W1 | R17 | R1 |

VARIABLE SIZED INFORMATION FRAME SWITCH FOR ON-BOARD SECURITY NETWORKS

The present invention relates to packet switching transmission networks intended to convey security-critical information with particular requirements in terms of guarantee and duration of transportation. Secure transmission networks such as these have numerous possible fields of application, including the interconnecting of equipment on board an aircraft for the exchanging of directives and of critical information.

A packet switching transmission network is generally referred to as an ATM network or switched ethernet network, the initials originating from the expression "Asynchronous Transfer Mode". It consists of a set of interconnection nodes, so-called "ATM or ethernet switches" joined by transmission links, cabled or otherwise, constituting a space grid characterized in that are distributed the entities which are to communicate with one another.

In order to be transmitted on an ATM or ethernet network, an item of information must undergo two successive shapings. It must firstly be digitized and shaped into the form of one or more binary message data packets supplemented, as a preamble, with binary service data enclosing various directives useful for the routing within the network, including identifiers of the destination entities of the packets, so as to constitute datagrams which can be manipulated by the ATM or ethernet switches. These datagrams must then themselves be shaped into the form of an electrical or optical transmission signal adapted to the physical characteristics of the transmission links interconnecting the ATM or ethernet switches.

Ethernet or ATM transmissions are mutually differentiated mainly by the use of packets of variable size (64 to 1518 bytes) for ethernet networks, while ATM transmissions are characterized by a fixed size. In what follows, the packets are considered to be of any size, thereby allowing the application to ATM or ethernet networks.

The stressing of the security aspect leads to the adoption in a packet switching network of measures aimed at offering the best guarantee that information will be transported in a maximum timescale, even when operation is degraded through a fault.

Among these measures, some are intended to eliminate the risks of loss or of delay of transportation of information owing to network congestion, others are intended to contrive matters such that the information which, despite the precautions taken, has lost its integrity during transportation is rejected so as not to clog up transmission links and needlessly monopolize processing time within the switches.

The measures designed to eliminate the risks of loss or of delay of transportation of information consist mainly in requiring the network to be deterministic so as to facilitate the analysis, a priori, of its behavior in all circumstances and in dimensioning it in such a way as to support the maximum possible traffic, this amounting to guaranteeing a minimum throughput for each information stream transported through the network, from a dispatching entity for the attention of one or more destination entities, said streams being referred to more concisely as virtual pathways.

In order for a transmission network to be deterministic, it is necessary for the virtual paths resulting from the instantaneous positions adopted by the switches at the moments of passage of the information to be predefined, invariant and dependent only on the dispatching and destination entities.

These constraints of being deterministic and of guaranteeing minimum throughputs on the virtual pathways of the network linking dispatching and destination entities affect the dimensioning of the network, that is to say the number and disposition of the switches and of the transmission links which provide the grid of switches, and also the performances required of the switches and the transmission links. These are manifested, for each transmission link, as a prescribed minimum throughput corresponding to the maximum foreseeable throughput having regard to the fact that they may be borrowed by various virtual pathways and, for each switch, as the requirement to be able to correctly route the data traffic arriving to its input/output ports when the transmission links attached to its input/output ports are all at their maximum foreseeable throughputs.

The measures designed to reject the information transported by the network once it has lost its integrity consists in providing, in the datagrams, integrity control information whose agreement with the apparent content of the datagram is verified before any operations of routing and retransmission within a switch.

A switch performs mainly:
  a detection and a demodulation, at the level of each of its input/output ports, of the transmission signals which reach it via the transmission links to which it is directly attached making it possible to recover the datagrams,
  a temporary storage of the information traffic received by all its input/output ports awaiting the execution of the operations for routing the datagrams during reception to one or more output ports of the switch,
  an analysis of the binary service data placed at the head of each datagram so as to deduce therefrom a broadcasting profile determining the output port or ports to which the relevant datagram should be routed,
  the execution, as soon as possible, of the broadcasting profile consisting of a recovery, in the buffer memory, of the traffic transporting the relevant datagram and its presentation on the desired output ports, and
  the remodulation of the datagrams at the level of the output ports so as to give them the form of a transmission signal adapted to their transportation over the transmission links connected to the output ports.

For the temporary storage of the various data traffic flows reaching in reception the input/output ports of a switch, one needs the same number of circulating memories as incoming data traffic flows, with a capacity tailored to the sought-after storage timescales and with a speed tailored to the throughputs of these incoming data traffic flows. These circulating memories, which manipulate the incoming traffic flows while they are in digital form, are produced from sets of banks of registers, each set having its banks of registers scanned cyclically in write mode, according to an invariant addressing law, at a sufficient rate to absorb the throughput of the relevant traffic flow. In read mode, each output port is allotted, according to a rate sufficient to restore the relevant traffic throughput, the possibility of accessing the entire set of circulating memories. The latter may be located at the level of the input/output ports or clustered together within a central storage device, the so-called central buffer memory.

The present invention is more particularly concerned with a packet switch with central buffer memory.

The requirement for a guarantee of transportation through a switch, of all the traffic flows reaching it on all its input/output ports at their maximum permitted throughputs gives rise with regards to its central buffer memory, to the need to tolerate, at input and at output, a throughput equal to the sum of all these maximum throughputs, this possibly leading to a throughput of very high value. Thus, a switch having 15 input/output ports with maximum throughputs of 100 Mbits/s must have a buffer memory accepting a throughput of 1.5 Gbits/s in write mode and in read mode.

This very high throughput required for the central buffer memory poses problems as regards the management of the latter, its energy consumption and radio interference engendered by the switchings inherent to its addressing and to the data reading and writing operations.

Moreover, it is beneficial to use the durations of transit of the datagrams through the buffer memory as integrity criterion. Furthermore, although those datagrams in the buffer memory which are excessively old are naturally overwritten by more recent datagrams that have arrived via the same input port, it is useful to know the durations of processing of the datagrams in order to rapidly detect the presence of operational problems within a switch and be able to take the necessary actions to isolate this switch as quickly as possible. The customary solution, which consists in dating the datagrams in transit through a switch, as a function of the instants of their receptions, has the drawback of increasing the amount of data to be stored in the buffer memory.

The aim of the present invention is a packet switch with a central buffer memory for the momentary storage of the information traffic flows which reach it via its input ports, which is organized and managed in such a way as to maximize the sum of the acceptable binary throughputs at the level of the input and output ports of the switch and to minimize its energy consumption and the electromagnetic disturbances engendered by the switchings brought about by its addressing and the operations in write mode and in read mode.

Its aim is also a packet switch with a central buffer memory for the momentary storage of the information traffic flows reaching it via its input ports, which is managed in such a way as to give an implicit measure of the latency time undergone by each datagram contained in the information traffic that it sees pass.

Its subject is a packet switch with several input ports and several output ports providing for the accesses to the switch of incoming and outgoing data traffic travelling along physical transmission links outside the switch and transporting information enclosing datagrams consisting of binary message data and of binary service data containing routing directives, each input port, respectively output port monitoring the accesses to the switch of incoming data traffic, respectively of outgoing data traffic and each physical link having a maximum throughput prescribed both at the receive end and at the send end, said switch comprising:

at the level of each of its input ports:
  a demodulator circuit providing for demodulation allowing the passage of the transmission signals conveyed by the transmission links which are attached to them, to the datagrams which they contain and,
  a circuit for extracting the binary service data contained in the datagrams received, at the level of each of its output ports:
  a modulator circuit providing for modulation allowing the passage of the datagrams to the transmission signals conveyed by the transmission links which are attached to them, and
  a send management circuit executing routing directives relating to the datagrams in transit, received by the switch on input ports, and at a central level,
  a buffer memory with a set of write- and read-addressable memory register banks for temporarily storing the incoming data traffic entering via the input ports, awaiting routing of the datagrams which it contains for redispatching to one or more output ports, and with addressing, data and control buses allowing the write- or read-selection of each of its register banks, the number of register banks being at least equal to that of the input ports and sufficient to store the data traffic received on each input port over a duration compatible with a maximum time allotted to the switch for routing the datagrams, sequencer paced by a clock, managing the address, data and read/write control buses of the buffer memory, and the accesses of the demodulation and send management circuits to the buffer memory, this management consisting in:
    splitting the banks of registers of the buffer memory into as many distinct groups as input ports,
    scanning, in write mode, the banks of registers of each group in a cyclic manner according to an invariant scanning law,
    granting each input port exclusive write-access to a single group of banks of registers which is assigned solely to it, according to a periodicity compatible with the maximum throughput of the incoming data traffic entering the switch via the relevant input port,
    and granting all the output ports general read-access to all the groups of banks of registers with a scanning of their banks of registers beginning with a selectable starting bank of registers and complying with the order of write-scanning, according to a periodicity compatible with the maximum binary throughput of the outgoing data traffic leaving via the relevant input/output port, and
  a routing automaton analyzing the binary service data associated with the datagrams which are transported by the data traffic in transit in the switch and are stored temporarily in the buffer memory, so as to extract from the routing directives, a broadcasting profile determining the redispatch output ports then redispatch directives to be executed by the send management circuits of the output ports identified by the broadcasting profile, and being characterized in that said sequencer provides for the management of the accesses of the input ports and of the output ports to the buffer memory:
  by chopping the time measured by the clock into a repetitive string of time slots within which are distributed, in an invariant manner, the write- and read-accesses of the input ports and of the output ports to the groups of banks of registers of the buffer memory, each input port having at least one write-access and each output port one read-access to a bank of registers of the buffer memory in the course of the repetitive string of time slots, and
  by using a system for addressing the banks of registers of the buffer memory reusing in a first part of the individual address of a register bank within the buffer memory, the address of the group of which it is a member, this address part also identifying the input port possessing the exclusive write-access within the relevant register bank, and, in a second part of the individual address of a bank of registers, its relative position with respect to the banks of registers of its membership group within a write-scan of this group.

Owing to the management carried out by the sequencer of the accesses of the input ports and of the output ports of the switch to its buffer memory, the addresses of the banks of registers of the buffer memory make it possible to determine both the input port and hence the incoming data traffic from which the data word stored by a bank of registers originates and the date of writing of this word since the write-accesses of the input ports to the memory as well as the banks of registers addressed in the course of these write-accesses depend only on the time variable delivered by the clock. The reading of a bank of registers of the buffer memory therefore gives an implicit measure of the timescale for storing the relevant data word and hence of its latency time within the switch, which latency time is also that of the datagram to which it belongs.

Advantageously, the buffer memory is organized as several modules operating in parallel and each having their banks of registers distributed, between the various groups write-assigned to the various input ports.

Advantageously, the buffer memory is organized as several modules of like capacity operating in parallel and having their banks of registers distributed between the various groups write-assigned to the various input ports by following one and the same distribution law.

Advantageously, the buffer memory is organized as two modules of like capacities, operating in parallel one in write mode, the other in read mode and periodically exchanging the write and read roles.

Advantageously, the buffer memory is organized as three modules of like capacities, operating in parallel in write mode and in read mode, the write and read actions in each of the three modules being mutually out of phase by a third of their period.

Advantageously, the buffer memory is organized as four modules of like capacities operating in parallel in write mode and in read mode, the write and read actions in each of the four modules being mutually out of phase by a quarter of their period.

Advantageously, the accesses of like nature, write or read, of the buffer memory which are initiated by the sequencer are grouped into several in the course of the repetitive string of time slots in such a way as to minimize the frequency of the read/write and write/read transitions which generate acclimatization times during which the buffer memory is not operational.

Advantageously, the write-accesses corresponding to the time slots grouped in such as way as to mimimize the frequency of the read/write and write/read transitions are carried out at addresses which differ from one another only through their first part coding the input port number, their second part related to the date of writing remaining common to all the grouped time slots. This results in minimization of the number of high-frequency switchings on the address bus in the course of the writing phases and consequently minimization of the consumption and of the noise generated.

Advantageously when an input port is inactive, it uses the write-access to the time slot associated with it in order to write a shortened data word with a specific value signaling an absence of valid data. This shortened data word uses only a few elements of the addressed bank of registers whereas the others take the values corresponding to the maintaining of the data previously on the databus. In this way the number of high-frequency switchings on the databuses in the course of the writing phases is minimized. This consequently results in minimization of the consumption and of the noise generated.

Advantageously, when an output port is inactive the thus unused read-access in the time slot associated with it is performed at an address corresponding to the last useful read. In this way the number of high-frequency switchings on the address and databuses in the course of the reading phases is minimized. This consequently results in minimization of the consumption and of the noise generated. These precautions are particularly effective in respect of packet switches operating within a deterministic network context for which the average load of each connection (physical transmission link) is low.

Advantageously, registers are reserved in each bank of the buffer memory for at least one flag of presence or of absence of datagram. An input port then profits from the periodic write-accesses to the group of banks of registers which is allotted to it by the sequencer so as either to write a datagram in the course of reception and to activate in each register bank in the course of writing, the datagram presence flag, or, in the absence of reception of datagram, solely to deactivate the flag of presence of datagram in each bank of registers in the course of writing. The datagram presence flag enables the operation of the switch to be made secure by ensuring that its send management circuits manipulate only banks of registers of the central buffer memory actually containing datagram data.

Advantageously, the routing automaton benefits from write- and read-accesses to the central buffer memory so as to store, in banks of registers unused by the input ports and for each datagram stored or undergoing storage, an encapsulation tag enclosing its broadcasting profile.

Advantageously, the routing automaton benefits from write- and read-accesses to the central buffer memory so as to store, in banks of registers unused by the input ports and for each datagram stored or undergoing storage, an encapsulation tag enclosing its broadcasting profile and an indication of its length.

Advantageously, the datagrams transported one after another on the same physical link are separated by a minimum time interval and the periodicity of assignment of a write-access to the input port at which the physical link culminates is less than the duration of this minimum time interval of separation, thereby guaranteeing the presence in the group of banks of registers of the central buffer memory write-assigned to an input port, of at least one bank of registers which is unused on separation between the stored data of two successive datagrams.

Advantageously, the datagrams transported one after another on the same physical link are separated by a minimum time interval and the periodicity of assignment of a write-access to the input port at which the physical link culminates is less than the duration of this minimum time interval of separation, thereby guaranteeing the presence in the group of banks of registers of the central buffer memory write-assigned to an input port, of at least one bank of registers which is unused on separation between the stored data of two successive datagrams, which is used to store an encapsulation tag enclosing the broadcasting profile extracted by the routing automaton, from the service information included in the datagram, this encapsulation tag enabling the operation of the switch to be made secure by ensuring that the send management circuits of the output ports execute operations in tune with the broadcasting profile associated with the datagram.

Figure 2:
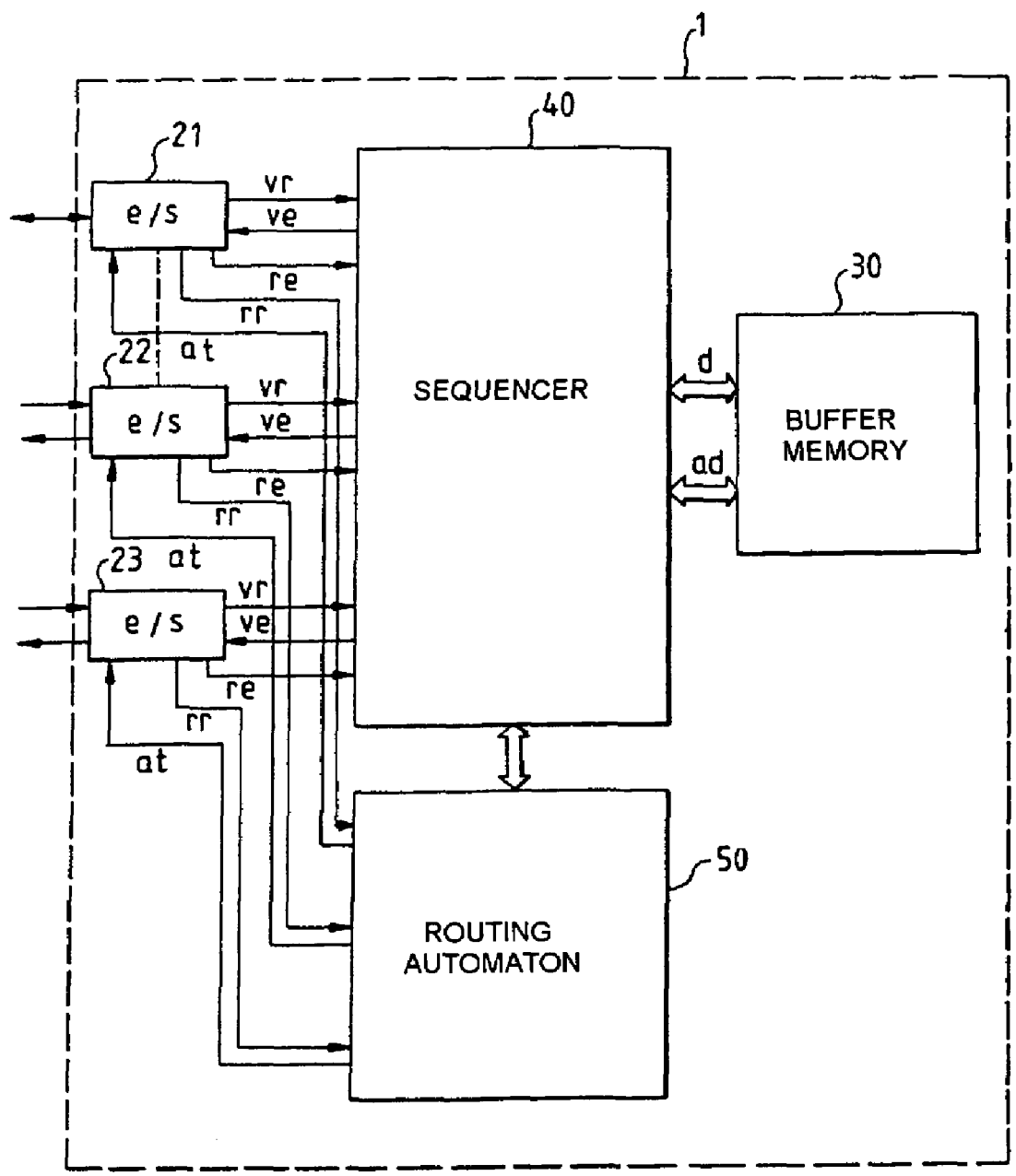
Figure 3:
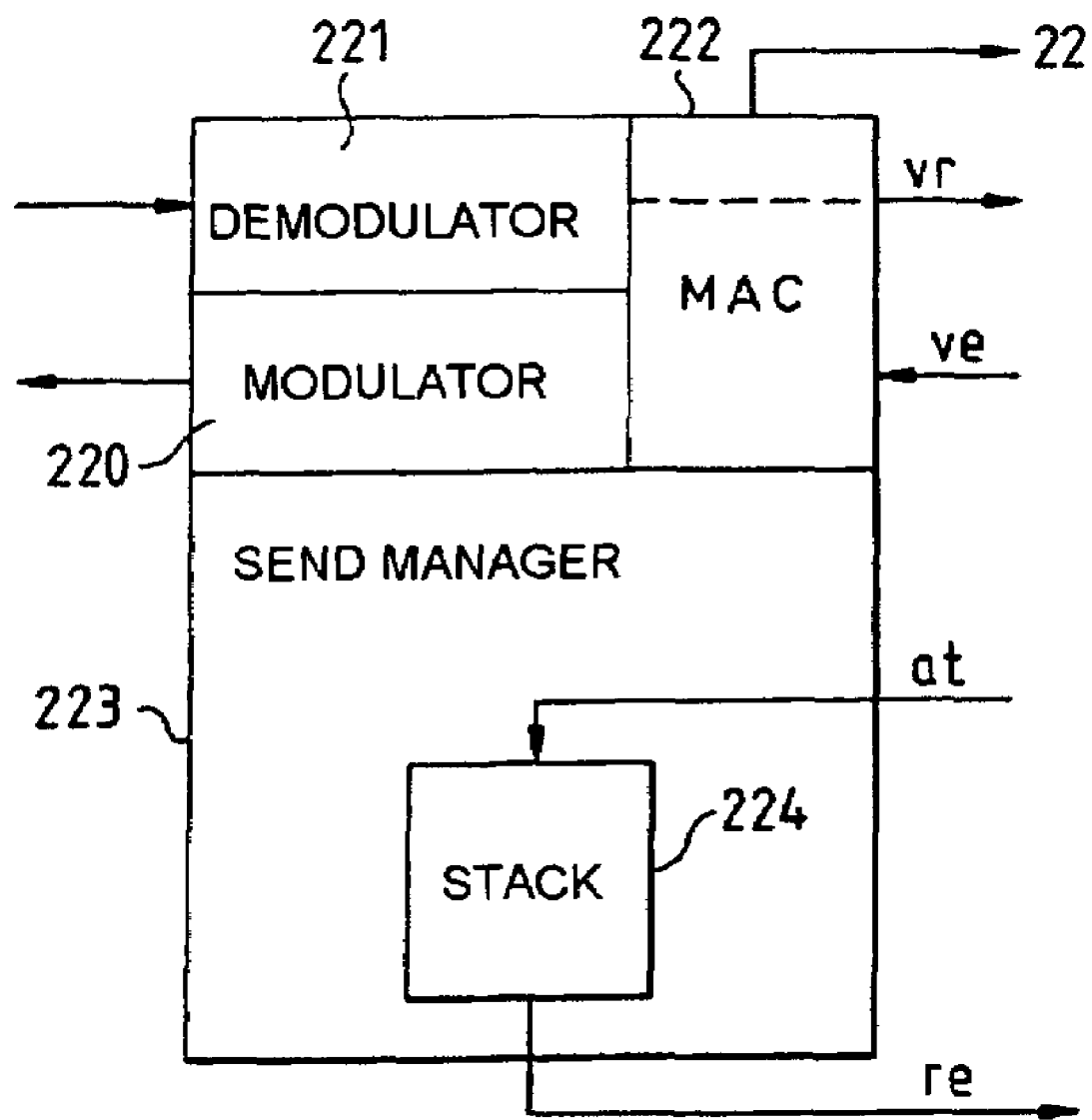
Figure 4:
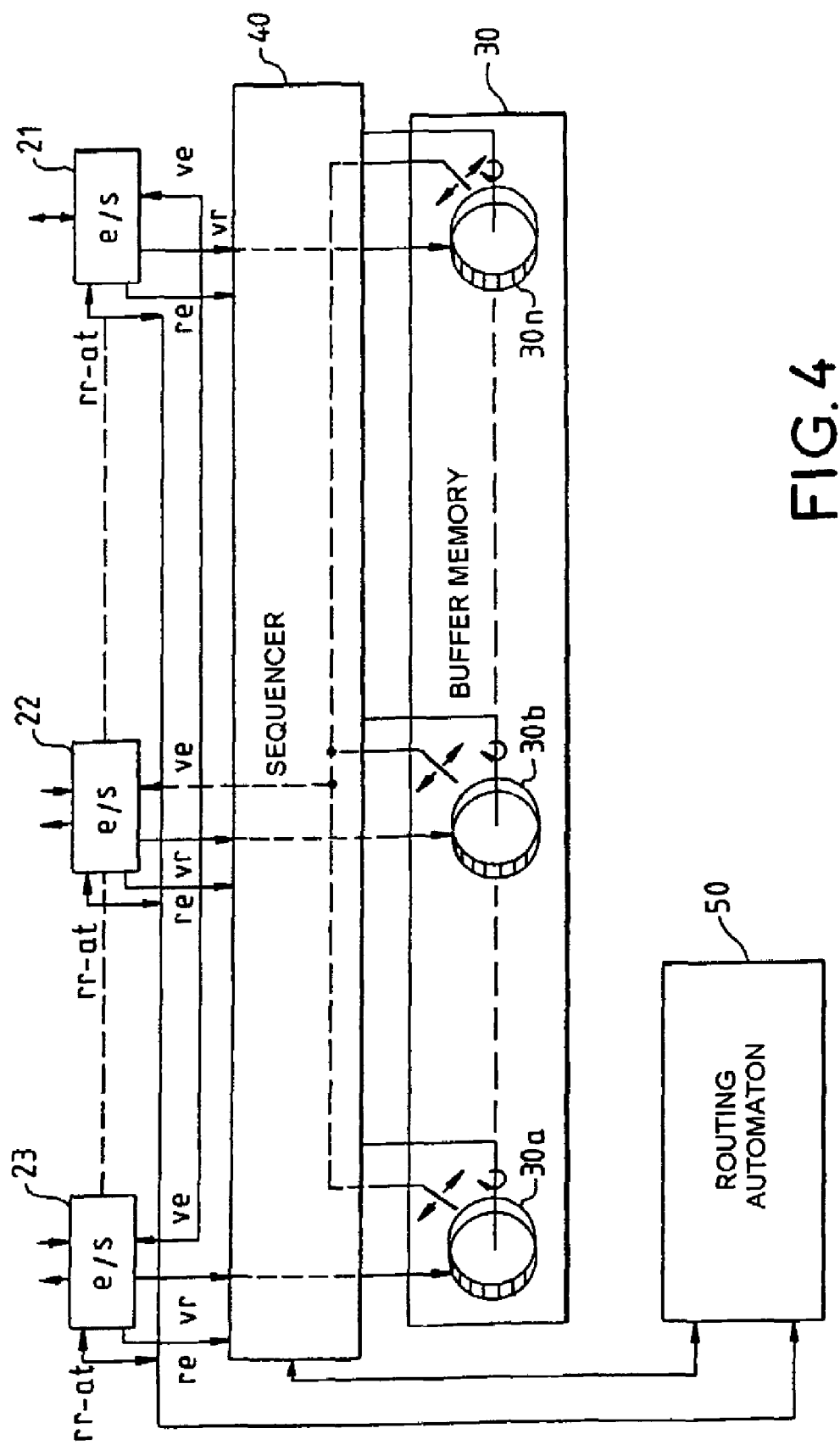
Figure 9:
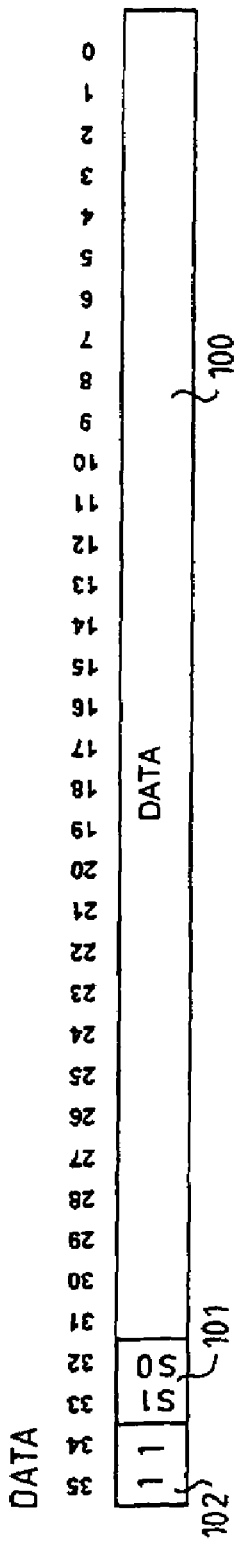
Figure 9:
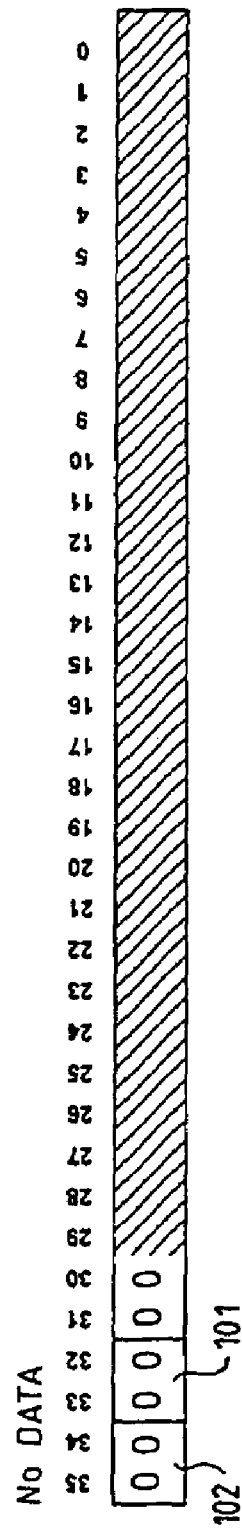
Figure 10:
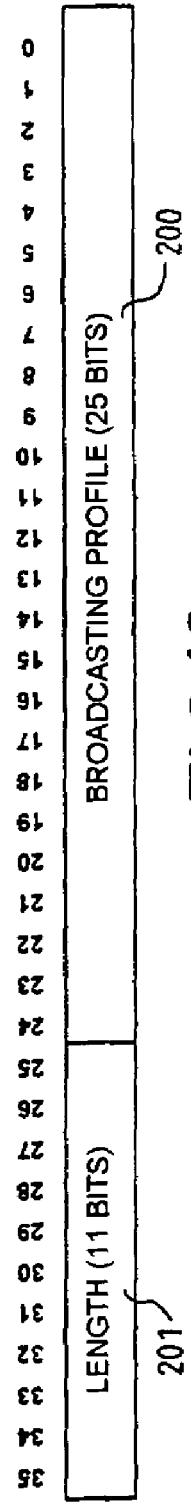

Other characteristics and advantages of the invention will emerge from the following description of an embodiment given by way of example. This description will be given in conjunction with the drawing in which:

a FIG. 1 represents an exemple of packet transmission network topology, a FIG. 2 represents a packet switch architecture with centralized buffer memory.

a FIG. 3 details the main parts of a switch input/output port, a FIG. 4 shows, in a more functional form, the packet switch architecture depicted in FIG. 2, FIGS. 5 to 8 illustrate various examples of sequencing for the accesses to the incoming and outgoing data traffic within the centralized buffer memory of a packet switch, within the framework of memories with one, two, three or four modules operating in parallel, a FIG. 9 illustrates formats for the data words stored in the banks of registers of the central buffer memory according to whether these words do or do not belong to datagrams constituting the useful messages transported by the network, and a FIG. 10 illustrates a format for an encapsulation tag added to a datagram during its passage through a packet switch and used for purposes of checking its routing within this switch.

FIG. 1 shows various items of equipment 10 to 18 which communicate with one another by way of a packet switching transmission network 20. The sets of items of equipment 10 to 18 are of unequal magnitudes and geographically dispersed over a zone covered by the packet switching transmission network 20 which is shown diagrammatically by a grid of interconnection nodes or packet switches represented by circles, and of physical transmission links represented by straight line segments joining the interconnection nodes. Each item of equipment represented by a rectangle is attached to the packet switching transmission network, at the level of one or more interconnection nodes placed in proximity, by way of a specialized terminal (not represented) and of one or more physical transmission links.

For their manipulation through a packet switching transmission network, the messages exchanged by the items of equipment undergo a double shaping: on the one hand, a digitization giving them the appearance of a string of binary data and a shaping into datagrams adapted to the routing processing that they are made to undergo by combinatorial and/or sequential logic circuits within each packet switch traversed and, on the other hand, a shaping of the datagrams into electrical or optical transmission signals for their transportation by the physical interconnection links.

The datagrams consist of a message binary data string preceded by a string of service binary data enclosing information useful to their routing within the packet switches traversed. They comply with a particular organizational format or protocol adapted to the characteristics of the combinatorial and/or sequential logic circuits performing the routings within the packet switches.

The electrical or optical signals used to transport the datagrams over the physical interconnection transmission links joining the packet switches to one another and to the items of equipment, are adapted to the physical characteristics of the links used.

At the ends of the transmission links, whether it be at the level of the terminals attaching the items of equipment to the network or at the level of the input/output ports of the network's interconnection nodes consisting of the packet switches, are modulation and demodulation circuits providing for the transformation of a transmission signal received by a physical transmission link into its corresponding datagram and conversely the transformation of a datagram manipulated at the level of an equipment terminal or a packet switch into a transmission signal adapted to transportation by the physical transmission links of the network. These modulation and demodulation circuits will not be detailed since they do not form part of the invention. In the example described, they are assumed to be adapted to asynchronous transmission signals which propagate one after another over the physical links connecting the packet switches and which each consist of a phase modulation of a temporary carrier preceded as a preamble by an unmodulated-carrier extremity intended to facilitate carrier recovery during demodulation.

A datagram received and demodulated at the level of an input/output port of a packet switch has to be routed within this packet switch to one or more other inputs/output ports so as to be resent on one or more physical transmission links attached directly to this packet switch so as to approach its destination or destinations. This so-called routing operation, which is the essential task of a packet switch, may necessitate a certain timescale dependent on the loadings of the resend input/output ports. Specifically, several datagrams may be received simultaneously by different input/output ports and have to be routed, for their resending, onto one and the same input/output port, thereby causing a tailback requiring the management of a queue.

The possibility of a routing timescale within a packet switch implies the need to make provision in each packet switch to store the incoming data traffic transporting the datagrams, over a duration greater than the maximum foreseeable routing timescale within the relevant packet switch. This temporary storage of each data traffic flow entering an interconnection node is done with the aid of circulating memories assigned individually to each traffic flow. A circulating memory is formed of a group of banks of registers which are scanned cyclically in write mode and in read mode in the same order of succession, at a sufficient rate to support the maximum throughput allowed for the data traffic flow to be stored and which are sufficient in number to ensure storage of the relevant incoming traffic over the desired timescale. Various groups of banks of registers assigned to the storage of the incoming data traffic entering a packet switch may be delocalized and distributed at the level of the input/output ports of the packet switch, or centralized and brought together within a central buffer memory. The centralization of the groups of banks of registers providing for the temporary storage of the incoming traffic has the advantage, in a secure network, of allowing centralization and hence simplification of the checks of proper operation of a packet switch.

FIG. 2 illustrates a possible architecture of a packet switching network switch 1.

The packet switch 1 communicates with other packet switches of the network or with items of equipment attached to the network by mono- or bidirectional physical transmission links. Its attachment to a bidirectional physical transmission link or to two monodirectional physical transmission links, one used for receiving and the other for sending, is done by way of a dedicated input/output port e/s. In FIG. 2 three input/output ports e/s 21, 22, 23 are represented but the number of input/output ports is not limited and corresponds to the number of attachments envisaged for the relevant packet switch, an input/output port providing the interface between a bidirectional physical transmission link or two monodirectional physical transmission links, one used for sending and the other for receiving.

In the example represented, the input/output port 21 provides the interface with a bidirectional physical transmission link and the input/output ports 22 and 23 the interface with two monodirectional physical transmission links, one used for receiving and the other for sending. Provision of the interface consists in performing the modulation and demodulation tasks and a queue management task when sending. The modulation task consists in shaping the datagrams to be sent into the form of a transmission signal with the physical characteristics adapted to those of the link used for sending which culminates at the revelant input/output port. The demodulation task consists in extracting the datagrams contained in the transmission signals received from the physical transmission link used for reception which culminates at the relevant input/output port. The queue management task consists in queuing, one behind another, the datagrams to be sent when the orders to send the latter reach the input/output port simultaneously or at too fast a rate having regard to the throughput of the physical transmission link used for sending.

An input/output port is linked to the internal processing circuits of the switch equipped therewith, by a data receive pathway, a data send pathway and several monitoring ports. Via the data receive pathway vr it delivers the incoming binary data traffic reaching the switch via the physical transmission link that it monitors. The data send pathway ve allows it to receive the datagrams that it has to send and that originate from other internal circuits of the switch. The monitoring ports, which include a routing request port rr, a datagrams allocation port at and a datagrams to be sent request port re serve for the management of its queue.

FIG. 3 details the makeup of an input/output port, for example the input/output port 22. The latter comprises modulator demodulator circuits 220, 221 associated with a MAC circuit 222 and with a send manager circuit 223 furnished with a queue management stack 224.

The modulator demodulator circuits 220, 221 associated with the MAC (Medium Access Control) circuit provide in both directions the interface between the datagrams flowing inside the switch and the transmission signals corresponding thereto on the physical transmission links attached to the relevant input/output port. The modulator 220 and the demodulator 221 are busy with tasks of the physical layer, that is to say of the inclusion, of the binary data manipulated in the switch, into a transmission signal able to be sent out of the switch, over a physical transmission link, and of the extraction of the binary data contained in the transmission signals received by a transmission link. The MAC circuit 222 accumulates the binary data supplied by the demodulator 221 into binary words whose length corresponds to the one-operation processing capacity of the internal digital processing circuits of the switch. It detects the start of receipt of a datagram by analyzing its header reserved for the binary service data of the network and sends, on the monitoring port rr, datagram routing requests accompanied by network service information extracted from the relevant datagram making it possible to determine the routing profile of the datagram. It can also carry out a check to monitor the integrity of each datagram received when they enclose an integrity check code, for example a CRC (Cyclic Redundancy Code).

The send manager circuit 223 receives, on the monitoring port at, allocations of datagrams each consisting of an identification of a datagram to be sent available within the switch. It places these allocations of datagrams in a queue management stack 224, for example of "First In First Out" type, and transfers as request to send on the monitoring port re, the oldest allocation of datagram appearing in the queue management stack 224 so that the data corresponding to the targeted datagram are applied to the send pathway ve of the input/output port.

In addition to its input/output ports 21, 22, 23, the packet switch 1 represented in FIG. 2 comprises: a routing automaton 30, a buffer memory 40 used to store over a certain timescale the data traffic arriving via the physical transmission links attached to it and a sequencer 50 managing the buffer memory 30 and the accesses to the latter by the various input/output ports 21, 22, 23 and the routing automaton 50.

The routing automaton 50 is a combinatorial and/or sequential circuit, for example with a microprocessor, which processes the routing requests sent by the various input/output ports 21, 22, 23 so as to extract therefrom the routing profiles associated with each datagram being received by the interconnection node and to engender, from these routing profiles, datagram allocation directives destined for the input/output ports before resending them. The routing requests, which may turn up simultaneously from several different input/output ports, are processed successively by the routing automaton 30 which either manages a queue, or regularly scans, in a specified order, the monitoring ports rr for the various input/output ports of the interconnection node.

The buffer memory 30 is a cluster of circulating memories whose presence is prescribed by the obligation to manage queues at the level of the input/output ports for the resending of datagrams and, to a lesser extent, by the processing times for the routing requests. It consists of a set of banks of registers of lengths equal to that of the binary words supplied by the input/output ports 21, 22, 23, which length is chosen as a function of the one-operation processing capacity of the digital circuits used in the packet switch.

As represented in FIG. 4, the set of banks of registers of the buffer memory 30 is split into as many separate groups $30a, \ldots, 30b, \ldots, 30n$ as there are input/output ports 21, 22, 23, write-scanned in a cyclic manner in an invariant order. Each group $30a, 30b, \ldots, 30n$ of banks of registers is write-reserved for the binary data traffic received by a specified input/output port 21, respectively 22, 23 in such a way that all the binary data traffic flows received by the set of input/output ports have individually, a sole assigned group of banks of registers so as to be recorded therein temporarily. Each group $30a, 30b, 30n$ has its banks of registers cyclically write-scanned at a sufficient rate to support the binary throughput of the data traffic to which it is assigned. Thus, at any instant, the buffer memory 40 holds the faithful records of the binary data traffic flows received by the packet switch over a duration which corresponds to the write-scanning cycle of its groups of banks of registers and which can easily be altered by adjusting the number of banks of registers per group.

Each group of banks of registers of the buffer memory 40 is read-scanned according to cycles in the same order as the writing cycles but which may be initiated from any one of its banks of registers by all the input/output ports since the latter may find themselves allocated for resending any datagram in the course of reception.

An input/output port identifies, in its routing requests the relevant datagram, through the registration address of its start word in the group of banks of registers of the buffer memory 40 which is assigned to the data traffic flow via which it reaches the packet switch. This address is borrowed by the routing automaton 30 in its datagram allocation directives destined for the other input/output ports, so as allow the send manager circuits of the relevant input/output ports to recover the binary data of the datagrams stored temporarily in the buffer memory.

The write- and read-scans of the various groups of banks of registers of the buffer memory 40, which are done for one and the same group with no phase relation between them but in one and the same order, and the management of the accesses to the banks of registers of the various groups of the buffer memory 30 by the input/output ports 21, 22, 23 and the routing automaton 50 are the province of the sequencer 40 whose operative mode will be detailed.

The sequencer 40 chops the time measured by a clock into a repetitive string of time slots in which are distributed, in an invariant manner, the write- and read-accesses of the input/output ports 21, 22, 23 to the banks of registers of the buffer memory 30.

With a view to obtaining operation of the buffer memory 30 as a set of partial circulating memories $30a, 30b, 30n$ assigned individually to the binary data traffic flows received by the various input/output ports 21, 22, 23 the sequencer 40 follows, for addressing the banks of registers of the buffer memory, a particular addressing procedure.

This addressing procedure is based on a distribution of the banks of registers into as many groups as input/output ports, each group being reserved individually, in respect of the writing operations, for a particular input/output port so that there is a one-to-one relation between the groups and the input/output ports as regards the writing operations. Such a distribution of the banks of registers of the buffer memory into separate groups may be done naturally, by using, in the addresses of the banks of registers, a few digits. The addressing procedure differs according to the mode, write or read.

In the course of string of accesses to the buffer memory which are assigned to one and the same input/output port for writing operations, the sequencer 40 selects the group of banks of registers which is write-assigned to the relevant input/output port, and cyclically scans the banks of registers of this group in an invariant order on which the input/output port has no influence.

In the course of a string of accesses to the buffer memory which are assigned to one and the same input/output port for one and the same read operation, the sequencer 40 leaves the choice of the group of bank of registers to be explored, and, within this group, the choice of the bank of registers for starting the exploration to the input/output port, but prescribes an order of scanning identical to that used for the writing operations.

To summarize, the sequencer 40 allots each input/output port an invariant periodic frame for write-access to a single reserved group of banks of registers of the buffer memory and a periodic frame for read-access to a group of banks of registers which is left to the choice of the input/output port, said periodic frame for read-access following the same order of scanning as the periodic frame used for writing in respect of the selected group but with a phase shift left to the choice of the input/output port. The write-access and read-access periodic frames allotted to one and the same input/output port may be entangled with one another and with those assigned to the other input/output ports.

On account of this mode of managing the accesses of the input/output ports of the packet switch to its buffer memory, the addresses of the banks of registers of the buffer memory make it possible to determine both the input/output port, hence the incoming data traffic, from which the data word stored by a bank of registers originates, and the date of writing of this word since the write-accesses of the input/output ports to the memory as well as the banks of registers addressed in the course of these write-accesses depend only on the time variable delivered by the clock. The reading of a bank of registers of the buffer memory therefore gives an implicit measure of the timescale of storage of the relevant data word and hence of its latency time within the packet switch, which latency time is also that of the datagram to which it belongs.

Figure 5:
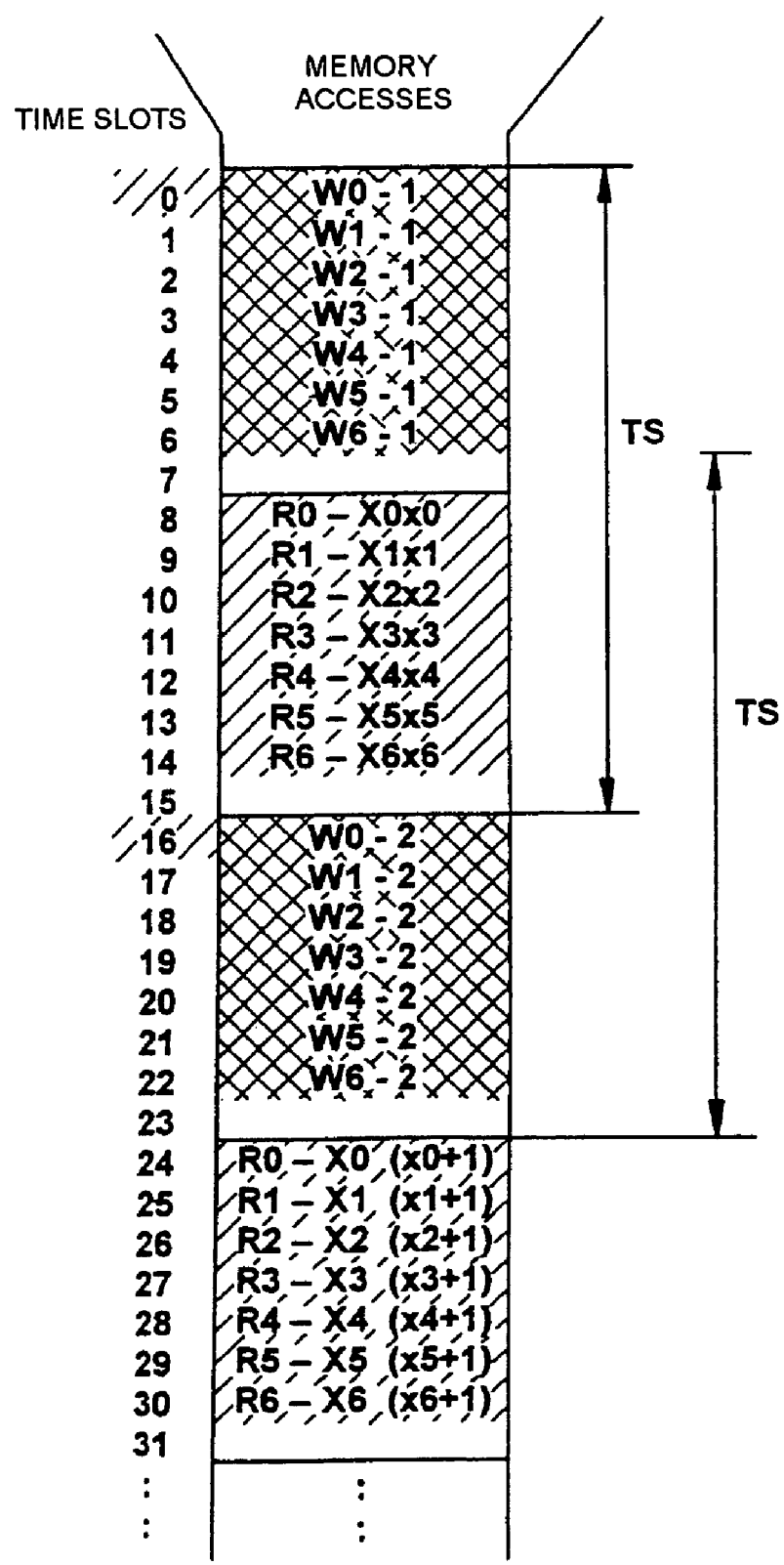

FIG. 5 illustrates an exemplary sequencing in accordance with this addressing procedure, envisaged for a packet switch with seven input/output ports each managing an incoming binary data traffic flow and an outgoing binary data traffic flow, all the binary data traffic flows having the same guaranteed maximum throughput, and for a central buffer memory consisting of a module of banks of registers which can be addressed one by one in random fashion.

The addressing of the banks of registers reflects an organization of the memory into seven separate groups of banks of registers assigned, in write mode, in a one-to-one manner, to the seven input/output ports. It is done at two levels, a first level written with large numerals corresponding to the membership group, that is to say to the input/output port to which the relevant bank of registers is write-assigned, and a second level written in small numerals giving the position of the relevant bank of registers in its membership group, that is to say its position in the invariant relative order adopted for scanning the banks of registers of a relevant group, both when writing and reading.

With this type of central buffer memory architectured as a single module, each time slot chopped up by the sequencer into its clock signal is assigned to a particular input/output port, for a specified write or read type operation in a specific bank of registers of the buffer memory.

The sequencing commences with a string of time slots 0 to 6 assigned to successive write-accesses $W0_{-1}, \ldots, W6_{-1}$ dedicated to each of the seven input/output ports, in the first bank of registers of each of the seven groups which are individually write-assigned to them.

The time slot numbered 7 is not assigned to the input/output ports but to the change of write read modes. It does not lead to any operation on the buffer memory but prevents the duration of inaccessibility of the memory during a change of write read modes from being attributed to an input/output port access time.

The sequencing continues with a string of time slots 8 to 14 assigned to successive read-accesses $R0-X0_{x0}, \ldots, R6-X6_{x6}$ dedicated to each of the seven input/output ports. In the course of one of these time slots 8 to 14, the input/output port, which has read-access, chooses a group Xi of banks of registers from which it wishes to read, and, within this group Xi, a particular bank of registers xi. The choice of the group to be read Xi appears in its send request since this choice corresponds to the input/output port from which the datagram to be sent originates, whereas the choice of the bank of registers xi to be read within the elected group Xi is an implicit choice deduced from the address of the bank of registers containing the start of the sought-after datagram and from the progression of reading of the datagram which in the course of the successive read-accesses allocated to the same input/output port.

The time slot 15 is not assigned to the input/output ports but to the change of read write modes. It plays a similar role to the time slot 7.

The following time slots 16 to 22 are again devoted to successive write-accesses $W0_{-2}, \ldots, W6_{-2}$ dedicated to each of the seven input/output ports, in each of the seven groups which are individually write-reserved for them but this time in the second bank of registers of each group and not in the first.

The time slot 23 is not assigned to the input/output ports but to the change of write read modes. It plays a similar role to the time slots 7 and 15.

The following time slots 24 to 30 are again assigned to successive read-accesses $R0-X0_{(x0+1)}$, dedicated to each of the seven input/output ports. In the course of one of these time slots 24 to 30, the input/output port which has read-access chooses a group of banks of registers from which it wishes to read and which is assumed to be the same as in its previous read-access, the sought-after datagram not yet being fully recovered, and, within this group, the bank of registers following the one previously read xi+1.

The time slot 31 is not assigned to the input/output ports but to the change of read write modes. It plays a similar role to the time slots 7, 15 and 23.

In the course of the following time slots, the groups of write- and read-access dedicated to each of the input/output ports follow one another regularly separated by time slots devoted to the changes of write read modes.

With each successive write-access of one and the same input/output port the relevant bank of registers within the group of banks of registers which is write-reserved for the relevant input/output port progresses by one unit in the immutable order adopted for the write-scanning of the group in question so that, after a certain timescale, there is wrap around and overwriting of data written previously with new data, the timescale being that regarded as maximum timescale tolerated for the routing processing of a datagram by the relevant packet switch.

With each read-access of one and the same input/output port, the relevant register bank within the register bank group explored progresses by one unit in the order adopted for the write-scanning of the relevant group, doing so until the input/output port performing the reading reckons to have recovered the entire sought-after datagram, this estimation being based on a priori knowledge of the length of the datagram appearing in service data included in the header of the datagram.

The grouping of several accesses to the memory, of like nature, write or read, makes it possible to minimize the frequency of the changes of write read modes and vice versa, which consume time and energy and which are the cause of electromagnetic noise.

The write-access periodic frame allotted to one and the same input/output port must make it possible to absorb the maximum throughput guaranteed for the data traffic received by this input/output port. If this throughput is B and the length of a bank of registers of the buffer memory b, this implies that the time span separating two successive writes on behalf of this same input/output port must be equal to b/B. For example, if the throughput of the binary data traffic received is 100 Mbits/s, and the width of the banks of registers 32 bits, a write-access will have to be effected every 320 ns.

In the same way, the read-access periodic frame allotted to one and the same input/output port must allow it to discharge, via the physical transmission link which it uses for sending, an outgoing data traffic flow at the maximum guaranteed throughput. For example, if this maximum guaranteed throughput for sending is 100 Mbits/s and the width of the banks of registers of the buffer memory 32 bits, a read-access will have to be effected every 320 ns.

Since in the previous exemplary sequencing it was considered that all the incoming and outgoing data traffic into and out of the relevant packet switch had the same guaranteed maximum throughput, the time spans separating two write-accesses and two read-accesses allocated to one and the same input/output port have the same duration labeled TS in FIG. 5.

The buffer memory must support, in write mode and in read mode, the throughputs imposed by the entire set of write-access and read-access periodic frames allotted to the various input/output ports. Since this buffer memory operates under time sharing between the various input/output ports, it must support, in write mode and in read mode, the sums of the maximum guaranteed binary throughputs when sending and receiving for the entire set of input/output ports of the packet switch. These sums rapidly attain very high values. For example, a packet switch with 15 input/output ports having guaranteed maximum throughputs of 100 Mbits/s must have a central buffer memory supporting throughputs of 1.5 Gbits/s during writing and reading. One therefore rapidly comes up against very high throughputs at the central buffer memory level.

To solve this problem of very high throughputs, the central buffer memory uses banks whose registers are written and read simultaneously in parallel. The throughputs required at the level of the banks of registers are thus divided by their number of registers. With banks of 32 registers with parallel writes and reads, the throughputs of 1.5 Gbits/s at the overall level of the memory are reduced to 47 Mbits/s at the level of the banks of registers.

One solution for absorbing the very high throughputs required at the memory level therefore consists in altering the number of parallel read and write registers of the banks of registers making up the central buffer memory. This solution cannot however be pushed very far since it has drawbacks. A first drawback is the complexity of the auxiliary circuits of the banks of registers necessary in order for their registers to be able to be read and written in parallel, which increases with the number of registers served in parallel in write and read mode. A second drawback is the reduction in the degree of occupancy of the registers of the memory by useful data due to the fact that the datagrams to be temporarily stored generally have a variable number of bits and rarely occupy a whole number of banks of registers so that one is very often left, at the end of storing a datagram, with a last partially occupied bank of registers whose percentage of inoccupancy grows with the size. Lastly, the length of a bank of registers cannot be larger than that corresponding to half the minimum silence time separating two datagrams if one wishes to keep a bank of registers coding an absence of data between two successive datagrams.

To allow the absorption by the central buffer memory of the very heavy binary data throughput required, it is proposed that it be designed as several independent modules operating in parallel rather than increasing the number of registers of its banks.

The sequencer then allots each time slot that it chops up into its clock signal to as many simultaneous memory accesses as there are modules, these simultaneous memory accesses being allocated to distinct data traffic flows, one and the same input/output port being able to have no more than two simultaneous accesses to two different banks of registers, one in write mode and the other in read mode.

The banks of registers of the buffer memory remain organized into as many separate groups as input/output ports, each of them being assigned solely to a specified input/output port for the recording of its incoming data traffic. However, they are distributed, within each group, between the various modules.

The possibility of simultaneous memory accesses in the course of one and the same time slot makes it possible, for one and the same apparent throughput of the memory, to lengthen the duration of a time slot in the ratio of the number of these simultaneous accesses and therefore to reduce in the same ratio the throughput required at the level of a module.

As before, the sequencer assigns, to each input/output port, in the course of distinct time slots, a string of write-accesses to the banks of registers of the group that is reserved for it and a string of read-accesses to the banks of registers of a group that it can choose, still complying with an immutable order of scanning within the groups. However, the banks of registers selected from one write-access to the next or from one read-access to the next can belong to different modules.

The modules are preferably of like capacities and the banks of registers belonging to one and the same group equitably distributed between the various modules. This allows the sequencer to adopt, in respect of the various modules, sequencings which are mutually identical at the level of the allocations of accesses to the input/output ports and of the write or read mode but which are mutually out of phase so as to comply with the constraint of allocation to an input/output port, of at most two simultaneous accesses to the buffer memory, one in read mode and the other in write mode. This is because, by virtue of the phase mismatch, different read or write modes and/or different input/output ports can be made to appear in respect of simultaneous accesses in the course of one and the same time slot.

The determination of the number Nm of necessary modules, that is to say of the reduction ratio for acclimatizing to the maximum throughput made possible by the technology used for the banks of registers while also satisfying the requirements of the write- and read-throughputs stemming from the guaranteed maximum throughputs for the incoming and outgoing binary data traffic flows into and out of the relevant packet switch is done by seeking to satisfy the inequality:

$$N_m \geq 2(N_p + 1)\frac{T_a}{T_s}$$

$N_m$ being the number of modules, $N_p$ being the number of input/output ports of the relevant packet switch, which number corresponds to the number of pairs of incoming and outgoing data traffic flows entering and leaving via the relevant packet switch, $T_a$ being the duration of the write- and read-access cycles in a bank of registers of the buffer memory prescribed by the technology used, and $T_s$ being the period separating two accesses of like nature (write or read) on behalf of one and the same input/output port at the level of the banks of registers of the buffer memory making it possible to satisfy the data throughputs guaranteed for the incoming and outgoing data traffic flows entering and leaving the relevant packet switch.

The duration $T_s$ is deduced from the minimum throughput required in order for the central memory to acclimatize to the maximum throughputs guaranteed for the data traffic flows crossing the relevant packet switch. If the data traffic flows entering and leaving the relevant packet switch all have the same guaranteed maximum throughput dm, the duration $T_s$ is deduced from this maximum throughput dm and from the number of registers B of the banks of the central buffer memory by the relation:

$$T_s = \frac{B}{d_m}$$

Figure 6:
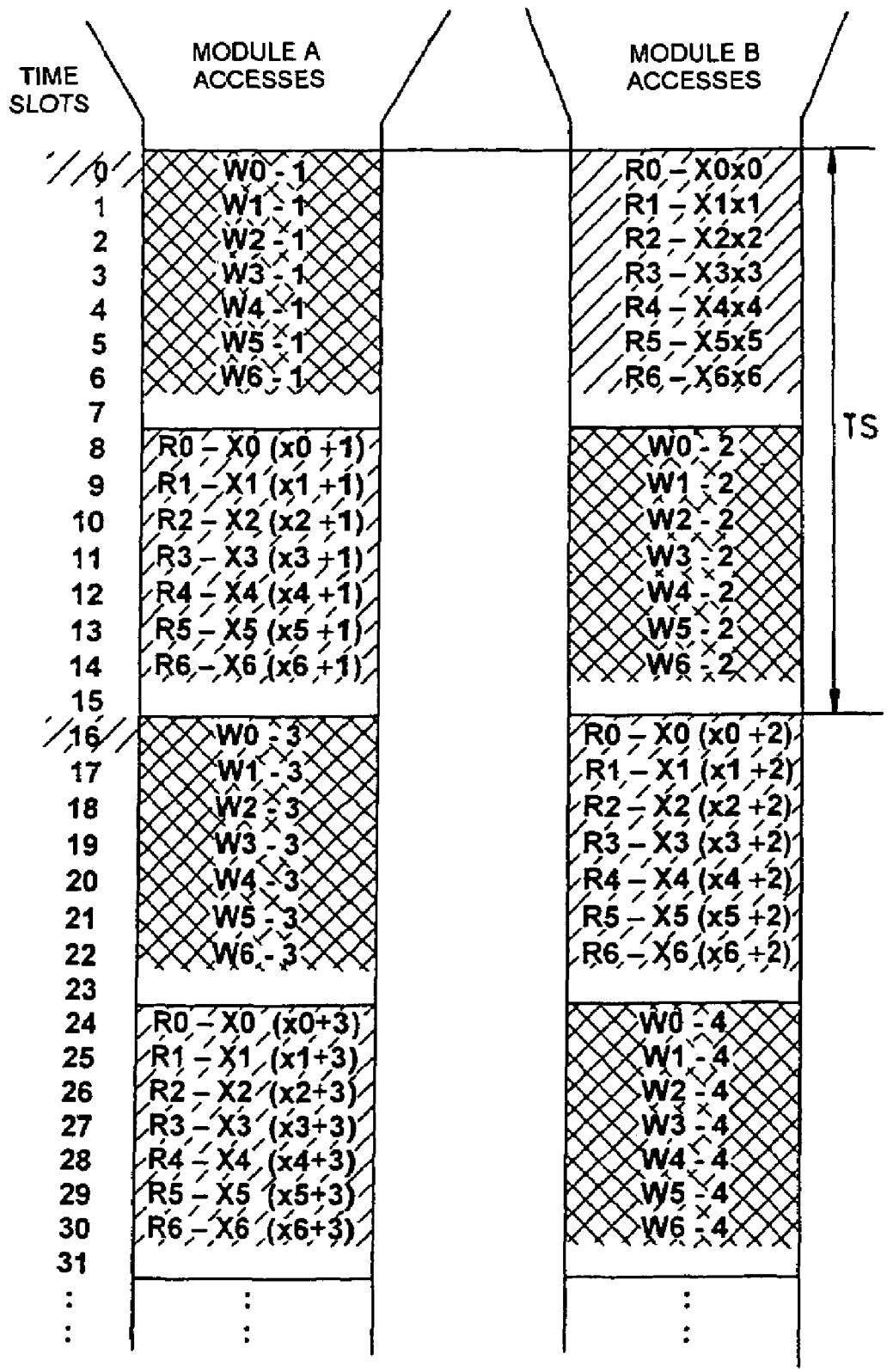

FIG. 6 illustrates an exemplary write- and read-sequencing for a central buffer memory with two modules A and B of like capacity operating in parallel, still within the framework of a packet switch with seven input/output ports 0 to 6 each managing an incoming binary data traffic flow and an outgoing binary data traffic flow, all the binary data traffic flows having the same guaranteed maximum throughput. The use of two modules makes it possible to operate each module at half the throughput of that of the overall buffer memory.

The sequencer chops up, into its clock signal, successive time slots of sufficient duration for an operation of writing or reading in a bank of registers of the modules.

As before, the banks of registers of buffer memory are distributed into seven distinct groups 0 to 6, as many as input/output ports, each of the groups being write-reserved for a particular input/output port 0, 1, 2, 3, 4, 5, 6 but these groups have their banks of registers distributed equally between the two modules A and B. For example, by having, as represented in FIG. 6, their banks of registers whose address part relating to their order of write-scanning, at the level of a group, is odd placed in the module A and their banks or registers whose address part relating to their order of write-scanning, at the level of a group, is even placed in the module B.

The notation adopted in this FIG. 6 for the addressing of the banks of registers is borrowed from FIG. 5 with a double labeling by a first large numeral giving the membership group of the relevant bank of registers, that is to say the input/output port to which it is write-assigned, and by a second small numeral giving its position in the group with respect to the immutable relative order adopted for scanning the banks of registers of a group when writing or reading.

With this type of central buffer memory architectured as two modules A and B, each time slot chopped by the sequencer into its clock signal is assigned to two simultaneous accesses to the central buffer memory, one for the module A and the other for the module B, each allocated to a predetermined input/output port for a likewise predetermined write or read type operation in a specific bank of registers of the buffer memory.

To comply with the constraint regarding the assignments of the simultaneous accesses to the buffer memory which still have to be allocated to different data traffic flows, the proposed sequencing systematically allocates, during the course of one and the same time slot, the simultaneous accesses to the two modules A and B, to one and the same input/output port but one in write mode and the other in read mode, the write and read modes being periodically exchanged between the two modules A and B.

The sequencing commences with a string of time slots 0 to 6 assigned:

for module A, to successive write-accesses $W0_{-1}, \ldots, W6_{-1}$ dedicated to each of the seven input/output ports 0, ..., 6, in the first bank of registers of each of the seven groups which are individually write-assigned to them, these first banks of registers of the seven groups being assumed to have an odd address 1, within their groups and therefore to belong to module A, and for module B, to successive read-accesses $R0-X0_{x0}, \ldots, R6-X6_{x6}$ of banks of registers of the module B which are dedicated to each of the seven input/output ports 0, ..., 6. In the course of one of these time slots 0 to 7, the input/output port which has write-access chooses a group Xi of banks of registers from which it wishes to read, and, within this group xi, a particular bank of registers Xi which is assumed to be of even address within its group. If this is not the case, it waits for a subsequent read-access of the module A.

The time slot numbered 7 is not assigned to the input/output ports but to the change of write read modes in the two modules A and B. It does not lead to any operation on the buffer memory but prevents the duration of inaccessibility of the memory during a change of write read modes within the modules A and B from being attributed to an input/output port access time.

The sequencing continues with a string of time slots 8 to 14 assigned:

for module A, to successive read-accesses $R0-X0_{(x0+1)}, \ldots, R6-X6_{(x6+1)}$ dedicated to each of the seven input/output ports. The input/output port, which has read-access, chooses a group Xi of banks of registers from which it wishes to read assumed to be the same as during its previous read-access to the module B, the sought-after datagram being assumed to be not fully recovered, and, within this group Xi, the bank of registers xi+1 of odd address, which follows that xi of even address, read previously from the module B, for the module B, to successive write-accesses $W0_{-2}, \ldots, W6_{-2}$ dedicated to each of the seven input/output ports, in the second bank of registers of each of the seven groups which are individually write-assigned to them, this second bank having an even address and lying in module B.

The time slot 15 is not assigned to the input/output ports but to the change of read write modes. It plays a similar role to the time slot 7.

For module A, the time slots 16 to 22 correspond to successive write-accesses $W0_{-3}, \ldots, W6_{-3}$ dedicated to each of the seven input/output ports, in each of the seven groups which are individually write-reserved for them but this time in the third bank of registers of each group which, like the first has an odd addressing.

For module B, the time slots 16 to 22 correspond to successive read-accesses granted to each of the seven input/output ports 0, ..., 6. The input/output port, which has read-access, chooses a group Xi of banks of registers from which it wishes to read. This group Xi is assumed to be the same as during its previous read-access to the module A, the sought-after datagram being assumed to be not fully recovered and, within this group Xi, the bank of registers xi+2 of even address, which follows that xi+1 of odd address, read previously from module A.

The time slot 23 is not assigned to the input/output ports but to the change of write read modes. It plays a similar role to the time slots 7 and 15.

The following time slots 24 to 30 are again assigned, for module A, to successive read-accesses $R0-X0_{(x0+3)}, \ldots, R6-X6_{(x6+3)}$ dedicated to each of the seven input/output ports. In the course of one of these time slots 24 to 30, the input/output port which has the write-access chooses a group Xi of banks of registers from which it wishes to read assumed still to be the same as in its previous read-access, the sought-after datagram being assumed to be not fully recovered and, within this group Xi, the bank of registers xi+3 of odd address, following that xi+2 of even address, previously read from module B.

For module B, the time slots 24 to 30 are assigned, again, to successive write-accesses $W0_{-4}, \ldots, W6_{-4}$.

The time slot 31 is not assigned to the input/output ports but to the change of read write modes. It plays a similar role to the time slots 7, 15 and 23.

In the course of the following time slots, the pairs of simultaneous accesses to the modules A and B, one in write mode and the other in read mode in read mode, dedicated to the input/output ports follow one another regularly separated by time slots devoted to the exchanges of write read modes between the two modules A and B.

With each successive write-access of one and the same input/output port, the relevant bank of registers within the group of banks of registers which is write-reserved for the relevant input/output port changes module by passing from module A to module B or visa versa and progresses by one unit in the immutable order adopted for the write-scanning of the group in question so that, after a certain timescale, there is wraparound and overwriting of data written previously with new data, the timescale being that regarded as maximum timescale tolerated for the routing processing of a datagram by the relevant packet switch.

With each read-access of one and the same input/output port, the relevant register bank within the register bank group explored changes module by passing from module A to B or visa versa and progresses by one unit in the immutable order adopted for the write-scanning of the relevant group, doing so until the input/output port performing the reading reckons to have recovered the entire sought-after datagram, this estimation being based on a priori knowledge of the length of the datagram appearing in service data included in the header of the datagram.

The grouping of several accesses to a module A or B, of like nature, write or read, makes it possible to minimize the frequency of the changes of write read modes and visa versa which consume time and energy, and which are the cause of electromagnetic noise.

Figure 7:
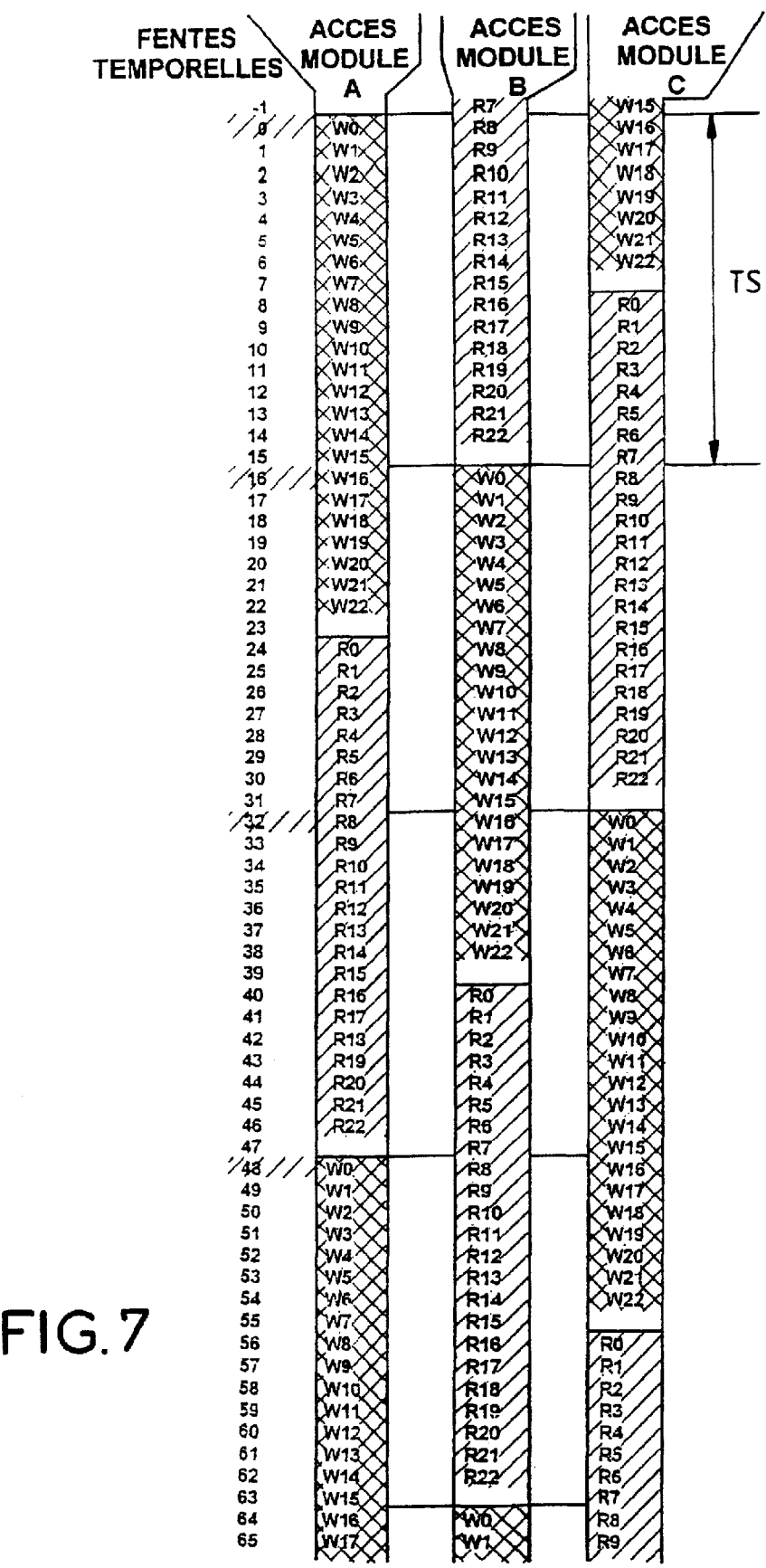

FIGS. 7 and respectively 8 illustrate examples of write- and read-sequencing for central buffer memories with three and respectively four modules of like capacities operating in parallel, within the framework of packet switches with twenty three and respectively thirty one input/output ports each managing an incoming binary data traffic flow and an outgoing binary data traffic flow, all the binary data traffic flows having the same guaranteed maximum throughput. The use of three modules makes it possible to operate each module at a third of the throughput of the overall memory and the use of four modules at a quarter of the throughput of the overall memory.

In the case of the parallel use of more than two modules, it is no longer possible to comply with the constraint of allocation to one and the same input/output port of at most two simultaneous accesses to the buffer memory, one in write mode and the other in read mode, by altering only the write or read modes, which would correspond to using sequencings for the two modules which are identical from the point of view of the input/output ports and of the write read modes, but 180 degrees out of phase. Some of the simultaneous accesses must necessarily not have the same allocation ports. This can still be achieved by using for all the modules the same sequencings from the point of view of the input/output ports and of the read write modes, but they must then be shifted out of phase by the appropriate amount, 120 degrees for three modules and 90 degrees for four modules.

For the sake of simplification, the accesses appearing in the sequencings proposed for four and three modules are no longer labeled in FIGS. 7 and 8 other than by the allocating input/output port and the prescribed mode, write or read. It goes without saying that, as in FIGS. 5 and 6, each access specifies not only the input/output port to which it is allocated and the write or read mode permitted but, also, a group of banks of registers and, within this group, a particular bank of registers, both of which are determined according to the same rules as before.

For the write operations the specified group of banks of registers is that reserved solely for the allocation input/output port and the bank of registers which is selected from this group, the next to be written following the invariant order of scanning of the banks of registers of the relevant group.

For the read operations, the group of bank of registers is specified by the allocation input/output port and the bank of registers which is selected within the group, the next to be read in the invariant order of scanning of the banks of registers of the relevant group, the allocation input/output port specifying moreover the address in the relevant group of the bank of registers starting a reading session.

With the sequencings just proposed, the groupings of the successive time slots about one and the same write or read mode make it possible not only to limit the frequency of the changes of modes of operation for the modules of the memory but also to decrease the high-frequency switchings of the address bus since they are also done while keeping, in the write mode, a fraction of the addressing unchanged, that corresponding to the address of the banks of registers within the various groups. This address fraction, which corresponds in a one-to-one manner to the date of writing, is by far the most important since there are many more banks of registers in a group than input/output ports.

The set of words written to the banks of registers of the central buffer memory corresponding to one and the same datagram constitutes a linear sequence of information. This linear sequence of information is localized within the group of banks of registers which is allocated solely to the input/output port ensuring reception thereof at the level of the packet switch and is accessible from knowledge of the address, within this group, of the bank of registers storing the start word of the datagram. It is therefore possible, within a packet switch, to make the utilization of a datagram's data stored in its central buffer memory secure by associating with the words which group them together in this central buffer memory, that is to say at the level of each bank of registers of this central buffer memory, one or more error detection bits pertaining to the informational content of the relevant bank of registers and/or the address within the memory of the relevant bank of registers. These error detection bits, which are advantageously determined by the security method described in French patent application No. 2 723 222 filed by the company Sextant Avionique, make it possible to halt the transmission, through the network, of datagrams which are impaired owing either:
to a failure of the central buffer memory of the relevant packet switch (erroneous data read from a bank of registers),
to a failure of the generation of the address sequences of banks of registers of the central buffer memory which are called by an input/output port in the course of a sequence of successive read-accesses to the central buffer memory (succession of erroneous addresses),
to a failure of a datagram allocation directive (erroneous initial datagram reading address).

The presence of local error detection bits added at the level of each bank of registers of the central buffer memory of a packet switch but not retransmitted outside of a packet switch, makes it possible to divorce the malfunctions within the packet switch itself, from the malfunctions of the physical layer which are related to the implementation of the transmission signals transporting the datagrams over the physical transmission links used by the network outside of its packet switches, the malfunctions of the physical layer forming the subject moreover of specific surveillance, by means of error correction bits of CRC type (the initials standing for Cyclic Redundancy Code) or parity correction bits added to each datagram as soon as it is sent and following it throughput its transportation through the network.

These error detection bits may be determined by an input/output port when it prepares a word to be written to a bank of registers of the central buffer memory and written together with the relevant word when the sequencer allocates it a write-access to the central buffer memory, on condition that the banks of registers of the central buffer memory are dimensioned accordingly, that is to say that they have a number of registers that are adapted to the dimension of the word extended by the error detection bits.

Generally, such is the case with switched networks of ethernet type, the datagrams are separated, in their transportation over one and the same physical link of the network, by minimum time intervals making it possible to insert, as a preamble, into the transmission signal of each datagram, a service signal used by the demodulator on the receive side for recovering the modulation carrier used and for performing the demodulation. During these separation time intervals, the incoming data traffic received by an input/output port continues to be recorded in the central buffer memory although it does not transport any data. One is then left with, in the central buffer memory, banks of registers containing data words belonging to datagrams and banks of registers containing meaningless data words, so-called "gap words", corresponding to the time intervals of separation of the successive datagrams received by one and the same input/output port. In order to improve the security of operation of a packet switch, it is advantageous to add, at the level of each bank of registers of the central buffer memory, in addition to a field of error detection bits, a field of datagram presence identification bits, the so-called "datagram presence flag", updated from a signaling of reception of a datagram engendered by the input/output ports.

FIG. 9 shows a possible makeup of a word stored in a bank of registers of the central buffer memory, depending on whether it belongs to a "data" datagram or to a separation time interval between two "no data" datagrams.

In this FIG. 9, the banks of registers of the central buffer memory are assumed to have thirty-six registers of one bit, thirty-two (bits 0 to 31) constituting a field 100 reserved for the storage of a datagrams word and four (bits 32 to 35) constituting two fields 101 and 102 reserved for service information, one 101 containing two error detection bits S0 and S1, the other 102 containing a datagram presence flag consisting of two bits.

When a bank of registers contains a word belonging to a datagram, as is the case with the bank of registers "data", it encloses the word belonging to the datagram in its field 100 of thirty-two bits, two error detection bits S0 and S1 in its field 101, bits whose values are dependent on the value of the word stored in the field 100 and possibly on the address of the bank of registers as taught by French patent application 2 723 222, and two datagram presence bits in its field 102 set to the logic value 1.

When a bank of registers does not contain any word belonging to a datagram, as is the case with the register bank "no data", it encloses, in its field 100, thirty-two bits of irrelevant values with the exception of bits 30 and 31 forced to zero for convenience, in its field 101, two error detection bits S1 and S2 arbitrarily set to 0, and, in its field 102, two datagram presence bits set to the logic value 0 signifying the absence of datagram. The value of bits 0 to 29 of the field 100, which are irrelevant, are preferably taken equal to those previously present on the databus. This makes it possible to minimize the number of high-frequency switchings affecting the databus, this being advantageous in respect of consumption and reduction of noise interference.

To improve the security of operation of the packet switch, it is proposed that the routing automaton be given the ability to access the banks of registers of the central buffer memory, in competition with the input/output ports so as to allow it to store, in the banks of registers not containing datagram words, information about the datagram routing directives that can be verified, for example by the send managers of the input/output ports.

To do this, one or more accesses reserved for the routing automaton are interposed into the sequencing, organized by the sequencer, of the accesses of the input/output ports to the buffer memory, always taking care that the sequencing depends only on the time variable measured by the clock. One recourse is to configure the sequencing of the accesses of the input/output ports taking account of one or two virtual input/output ports and to assign the accesses reserved for these virtual input/output ports to the routing automaton, the latter then determining at its convenience the address of the bank of registers in which it effects a read or write operation.

Advantageously, the routing automaton uses its accesses to the buffer memory to add to each datagram in the course of storage, an encapsulation tag of the size of a bank of registers, enclosing the broadcasting profile of the datagram, that is to say the packet switch's various input/output ports through which the relevant datagram must be resent and possibly, the length of the relevant datagram.

The storage of the broadcasting profile makes it possible, when reading the associated datagram with a view to sending it on a particular input/output port, to verify that this send operation does indeed agree with the envisaged broadcasting profile. It avoids the need for the datagram coding mechanism (CRC or parity) to have to cope with the detection of a malfunctioning of the packet switch by a device placed downstream in the network.

The storage of the length of a datagram makes it possible to render it autoextractable if the encapsulation tag is placed in a bank of registers preceding the first word of the datagram.

Advantageously, the broadcasting profile appearing in the encapsulation tag may be dynamic, that is to say comprise flags assigned to each input/output port to indicate whether the associated datagram is or is not to be resent by the relevant input/output port, and which are activated by the routing automaton and deactivated by the send management circuits of the input/output ports. This makes it possible to avoid the transmission of a datagram more than once by one and the same input/output port.

FIG. 10 shows a possible makeup of an encapsulation tag of the size of a bank of thirty-six registers of one bit, of which a field 200 of twenty-five bits which is reserved for the broadcasting profile makes it possible to manage twenty-five input/output ports in send mode, and a field 201 of eleven bits for the length of the datagram. Such a tag is particularly adapted to the encapsulation of ethernet frames whose length lying between 64 and 1518 bytes is coded on 11 bits without using the datagram presence or absence codes (field 102 FIG. 9).

The invention claimed is:

1. A packet switch for receiving and transmitting datagrams, the datagrams including binary message data and binary service data, the binary service data having routing directives, comprising:

input ports for respectively receiving incoming datagrams traveling along physical transmission links outside the packet switch, the input ports each having maximum transmission rates prescribed for incoming datagrams, each input port comprising:
  a demodulator circuit for extracting datagrams from transmission signals received by way of the physical transmission links and,
  a circuit for extracting the binary service data included in the datagrams extracted by the demodulator circuit, output ports for respectively transmitting datagrams to second physical transmission links outside the packet switch, the output ports each having maximum transmission rates prescribed for outgoing datagrams, each output port comprising:
  a modulator circuit for transforming datagrams into transmission signals that are conveyed through said second physical transmission links attached to the output port; and
  a send management circuit for executing the routing directives relating to the datagrams received by the switch through the input ports, and a buffer memory having:
  a set of write- and read-addressable memory register banks assigned for temporarily storing the incoming datagrams entering via the input ports; and
  addressing, data and read-write control buses allowing the write- or read-selection of each register banks;
  wherein the number of register banks is at least equal to the number of input ports and the number of the register banks is sufficient to store the datagrams received on each input port over a duration compatible with a
  maximum time allotted to the switch for routing the datagrams, a sequencer paced by a clock, for performing managements including managing the addressing, data and read-write control buses of the buffer memory, and managing accesses of the demodulation and the send management circuits to the buffer memory, said managements including the operations of:
  splitting register banks of the buffer memory into as many distinct register bank groups as input ports,
  scanning, in write mode, the register banks of each group in a cyclic manner according to an invariant scanning law,
  granting to each input port an exclusive write-access to a single group of register banks which is assigned solely to the corresponding input port, according to a periodicity compatible with the maximum prescribed transmission rate of the incoming data traffic entering the switch via the relevant input port, and
  granting to each output port a general read-access to all register bank groups by scanning, in read mode, the register banks of all register bank groups, a scanning of a register banks group begins at a selectable starting register bank and complying with the order of write-scanning, according to a periodicity compatible with the maximum prescribed transmission rate of the outgoing data traffic leaving via the relevant output port, and a routing automaton for analyzing the binary service data included in the datagrams that are stored temporarily in the buffer memory, so as to extract from the routing directives, a broadcasting profile determining which output ports a datagram is to be dispatched to, and executing said dispatching through the send management circuits of the output ports identified by the broadcasting profile, wherein the sequencer performs management of the accesses of the input ports and of the output ports to the buffer memory, including:
  chopping the time measured by the clock into a repetitive string of time slots within which are distributed, in an invariant manner, for the write- and read-accesses of the input ports and of the output ports to the groups of register banks of the buffer memory, each input port having at least one write-access and each output port one read-access to a register bank of the buffer memory during the repetitive string of time slots, and
  reusing the register banks of the buffer memory by using an addressing system, wherein, each register bank include an address having a first part of the address identifies a group to which the register bank belongs and identifying the input port for possessing the exclusive write-access within the relevant register bank, and a second part of the address identifies a relative write-scan position of the register bank within the corresponding group of the register banks.

2. The switch as claimed in claim 1, wherein the buffer memory is organized as several modules operating in parallel, each module being distributed with register banks, between the various groups associated with the various input ports.

3. The switch as claimed in claim 2, wherein each module has their register banks distributed between the various groups associated with the various input ports by following one distribution law.

4. The switch as claimed in claim 2, wherein the buffer memory is organized as two memory register bank modules operating in parallel, one in write mode, the other in read mode and periodically exchanging the write and read roles as determined by the sequencer.

5. The switch as claimed in claim 2, wherein the buffer memory is organized as three memory register bank modules operating in parallel in write mode and in read mode, the write and read actions in each of the three modules being mutually out of phase by a third of their period.

6. The switch as claimed in claim 2, wherein the buffer memory is organized as four memory register bank modules operating in parallel in write mode and in read mode, the write and read actions in each of the four modules being mutually out of phase by a quarter of their period.

7. The switch as claimed in claim 1, wherein the sequencer performs the management of the accesses of the input ports and of the output ports to the buffer memory in such a way as to minimize the frequency of the changes of read and write modes of the buffer memory.

8. The switch as claimed in claim 7, wherein a grouping of write-accesses clusters together accesses dedicated to different input ports and reuses unchanged the second part of the address relating to the position of the banks of registers within their membership group.

9. The switch as claimed in claim 1, wherein, when an output port does not require the read-accesses in the banks of registers of the buffer memory which are allotted to it by the sequencer, the addressing bus of the buffer memory keeps the value taken in the course of the previous addressing cycle.

10. The switch as claimed in claim 1, wherein the registers in each of the corresponding register bank groups are reserved for at least one flag indicating presence or absence of datagram managed by the input ports.

11. The switch as claimed in claim 10, wherein the sequencer allows the routing automaton accesses to the buffer memory so as to store, in the register banks unused by the input ports and for each datagram in the course of storage, an encapsulation tag enclosing its broadcasting profile.

12. The switch as claimed in claim 10, wherein the sequencer allows the routing automaton accesses to the buffer memory so as to store, in the register banks unused by the input ports and for each datagram in the course of storage, an encapsulation tag enclosing its broadcasting profile and an indication of its length.

13. The switch as claimed in claim 1, used in a network where the datagrams transported one after another on the same physical link, are separated by a minimum time interval, wherein the sequencer allocates to each input port, write-accesses to the buffer memory with a periodicity less than said minimum time interval of separation.

14. The switch as claimed in claim 1, used in a network where the datagrams transported one after another on the same physical link, are separated by a minimum time interval, wherein the sequencer allocates to one port, write-accesses to the buffer memory with a periodicity less than said minimum time interval of separation, thereby guaranteeing the presence in the corresponding group of register banks of the buffer memory write-assigned to an input port, of at least one register bank which is unused on separation between the stored data of two successive datagrams, said unused register bank being used to store ahead of a datagram, an encapsulation tag enclosing its broadcasting profile extracted by the routing automaton, from the service information included in the datagram.

15. The switch as claimed in claim 1, used in a network where the datagrams transported one after another on the same physical link, are separated by a minimum time interval, wherein the sequencer allocates to one and the same input port, write-accesses to the buffer memory with a periodicity less than said minimum time interval of separation, thereby guaranteeing the presence in the group of banks of registers of the buffer memory write-assigned to an input port, of at least one register bank which is unused between two successive datagrams, said unused banks of registers being used to store ahead of a datagram, an encapsulation tag enclosing its broadcasting profile extracted by the routing automaton, from the service information included in the datagram and an item of information regarding its length.

* * * * *